United States Patent
McQueen et al.

(10) Patent No.: US 11,423,750 B2
(45) Date of Patent: Aug. 23, 2022

(54) DATA-SECURE SENSOR SYSTEM

(71) Applicant: Apple Inc., Cupertino, CA (US)

(72) Inventors: Travis McQueen, San Jose, CA (US); Clark Della Silva, San Francisco, CA (US); Scott G. Johnston, Los Gatos, CA (US); Wade Barnett, San Jose, CA (US); William Burchill, San Jose, CA (US); Joseph Hakim, Soquel, CA (US); Bernd Adler, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/930,218

(22) Filed: Jul. 15, 2020

(65) Prior Publication Data

US 2020/0365000 A1  Nov. 19, 2020

Related U.S. Application Data

(63) Continuation of application No. 16/359,896, filed on Mar. 20, 2019, now Pat. No. 10,762,755.

(51) Int. Cl.
*G08B 13/00* (2006.01)
*G08B 13/196* (2006.01)
(Continued)

(52) U.S. Cl.
CPC ....... *G08B 13/19656* (2013.01); *G06N 20/00* (2019.01); *H04L 47/20* (2013.01); *H04L 63/1475* (2013.01); *H04L 63/162* (2013.01)

(58) Field of Classification Search
CPC ............ G08B 13/19656; G08B 13/196; G08B 13/19602; G08B 13/19608; G08B 13/19665; G08B 13/19691; G08B 13/19671; G08B 13/19686; G08B 21/0476; G06N 20/00; G06N 3/0454; G06N 3/08; H04L 47/20; H04L 63/1475; H04L 63/162; H04L 63/0421; H04L 63/0245;
(Continued)

(56) References Cited

U.S. PATENT DOCUMENTS 7,952,760 B2   5/2011   Stokes et al.
10,762,755 B2  9/2020   McQueen et al.
(Continued)

OTHER PUBLICATIONS

U.S. Appl. No. 16/359,896, Non-Final Office Action, dated Dec. 26, 2019, 18 pages.

*Primary Examiner* — Frank F Huang
(74) *Attorney, Agent, or Firm* — Kilpatrick Townsend & Stockton LLP

(57) ABSTRACT

In some embodiments, a data-secure sensor system includes one or more processors configured to receive sensor data (e.g., image data, audio data, etc.) and generate descriptive data based on the sensor data that corresponds to a physical area that corresponds to information about identified objects or activity in physical area, an input/output (I/O) port, and an I/O choke communicatively coupled between the one or more processors and the I/O port, the I/O choke configured to limit a communication bandwidth of the I/O port to a maximum data rate. The one or more processors can be configured to prevent the sensor data from being accessible via any external port of the data-secure camera system, including the I/O port, and allow the descriptive data to be accessible via the I/O port.

16 Claims, 8 Drawing Sheets

(51) Int. Cl.
*H04L 9/40* (2022.01)
*H04L 47/20* (2022.01)
*G06N 20/00* (2019.01)

(58) Field of Classification Search
CPC ............... H04L 45/08; G09K 9/00335; G09K 9/00342; G09K 9/00771; G06T 7/20; G06T 2207/30232; H04N 21/23418; H04N 21/44008; H04N 7/18; G06F 21/55; G06V 20/52; G06V 40/20

See application file for complete search history.

(56) References Cited

U.S. PATENT DOCUMENTS

| | | | |
|---|---|---|---|
| 2004/0135885 A1* | 7/2004 | Hage | G08B 13/19697 348/143 |
| 2005/0102573 A1* | 5/2005 | Sun | G06F 15/7842 714/30 |
| 2005/0265359 A1 | 12/2005 | Drew et al. | |
| 2010/0007750 A1* | 1/2010 | Lundberg | H04N 5/23241 348/211.3 |
| 2012/0019685 A1* | 1/2012 | Morioka | H04N 21/4223 348/222.1 |
| 2014/0129226 A1 | 5/2014 | Lee et al. | |
| 2014/0320648 A1* | 10/2014 | Sager | H04N 7/181 348/143 |
| 2016/0066056 A1* | 3/2016 | Mountain | H04N 21/4385 725/25 |

\* cited by examiner

DATA-SECURE SENSOR SYSTEM

CROSS-REFERENCES TO RELATED APPLICATIONS

This application is a continuation of U.S. patent application Ser. No. 16/359,896, filed on Mar. 20, 2019, which claims the benefit of U.S. Provisional Patent Application No. 62/680,359, filed on Jun. 4, 2018, which are herein incorporated by reference in their entirety for all purposes.

TECHNICAL FIELD

The present disclosure relates generally to home security systems, and in particular to video camera systems configured for monitoring a data sensitive environment.

BACKGROUND

Smart home technology has greatly improved in power and functionality in recent years and can provide an enhanced user experience that can be tailored to meet an individual user's particular needs. For instance, smart lights, smart security systems, smart entertainment systems, environmental control systems (HVAC), and the like, are becoming more and more customizable and integrated as the internet-of-things (IoT) sets a foothold in modern home designs.

Home security cameras, in particular, are more prevalent and provide sophisticated capabilities to help users better secure their home. In some systems, users can have the convenience of remotely viewing and controlling aspects of their security cameras via a laptop, smart phone, or other mobile device. That way, a user can safely investigate unexpected activity at the home, monitor visitors or guests, check for mail deliveries, and the like. However, security cameras, sensors, etc., can be vulnerable to hacking or other cybercrimes, which may give unauthorized individuals access to sensitive images or details about a user's home. For that reason, users typically do not install cameras in sensitive or private areas such as a bedroom or bathroom, or areas where security is paramount (e.g., location of a safe or valuables), despite the fact that activity in these areas may be important to the user. For instance, it can be very important to know when someone is accessing a safe or if vulnerable individuals (e.g., small children or elderly) need assistance.

Thus, home security cameras and smart homes in general have improved much over the last decade, but many limitations and vulnerabilities still exist. Better alternative solutions to these problems are needed.

BRIEF SUMMARY

In certain embodiments, a data-secure system includes one or more processors configured to: receive sensor data corresponding to a physical area; and generate descriptive data based on the sensor data, the descriptive data being different than the sensor data, and the descriptive data corresponding to information about identified objects or activity in the physical area; and an input/output (I/O) port, where the one or more processors are further configured to: prevent the sensor data from being accessible via any external port of the data-secure system, including the I/O port; and allow the descriptive data to be accessible via the I/O port. The data-secure system may further include an I/O choke communicatively coupled between the one or more processors and the I/O port, the I/O choke configured to limit a communication bandwidth of the I/O port. The I/O choke may limit the communication bandwidth to any suitable maximum data rate (e.g., including but not limited to a maximum data rate set between 5 kbps and 100 kbps.). In some aspects, the sensor data can include image data, where the descriptive data does not include the image data. The data-secure system may further include a memory block, controlled by and only accessible by the one or more processors, the memory block configured to store the image data and corresponding image analysis data, where the memory block is inaccessible via any external port of the privacy-secure camera system including the I/O port, and wherein only the one or more processors have read and write access to the memory block.

In some embodiments, the one or more processors can include a machine learning (ML) processor configured to generate the descriptive data, where the data-secure system further includes: an input port; and a second memory block communicatively coupled between input port and the one or more processors, wherein the second memory block is configured to store configuration data received via the input port, the configuration data configured to update the ML processor, and wherein the second memory block is only writeable via the input port and only readable via the one or more processors. In some implementations, the data-secure system can further include a data monitoring processor coupled to the I/O port and configured to: detect sensor data passing through the I/O port; and take remedial action in response to detecting the sensor data passing through the I/O port. In some cases, the remedial action may include at least one of: initiating an alert; ceasing all data traffic into and out of the I/O port for a predetermined time; requesting secure authorization; restoring a preset firmware configuration to a trusted environment; or shutting down the privacy-secure camera system. In some aspects, the one or more processors, the I/O port, and the I/O choke may be contained on a single integrated circuit.

Certain embodiments may include a non-transitory computer-program product tangibly embodied in a machine-readable non-transitory storage medium that includes instructions configured to cause one or more processors of a data-secure system to: receive and analyze sensor data corresponding to a physical area; generate descriptive data based on the sensor data that includes information about identified objects or activity in the physical area, wherein the descriptive data is different than the sensor data; receive a request for information corresponding to the physical area; sending the descriptive data to an I/O port in response to receiving the request; and prevent the sensor data from being accessible via any external communication port of the data-secure system, including the I/O port. In some aspects, the preventing the sensor data from being accessible via any external communication port of the data-secure system may include limiting a communication bandwidth of the I/O port via an I/O choke. In some implementations, the I/O choke limits the maximum data rate into and out of the I/O port (e.g., to less than 100 kbps, or other suitable value, as would be appreciated by one of ordinary skill in the art with the benefit of this disclosure). The instructions of the computer-program product can be further configured to cause the one or more processors of the data-secure system to: monitor the I/O port for data traffic containing structured image data or video data; and take a remedial action upon detecting data traffic having structured image data or video data. In some cases, the request can be a user-initiated inquiry about the identified objects or activity in the physical area. The data-secure system may be integrated on a single integrated circuit.

In some embodiments, the data-secure system includes a memory block configured to store the sensor data and descriptive data, wherein the memory block is inaccessible via any externally accessible electrical contact on the integrated circuit including the I/O port. In some aspects, only the one or more processors have read and write access to the memory block. The one or more processors can include a machine learning (ML) processor configured to generate the descriptive data, wherein the data-secure system further includes: an input port; and a second memory block communicatively coupled between input port and the one or more processors, wherein the second memory block is configured to store configuration data received via the input port, the configuration data configured to update the ML processor, wherein the second memory block is only writeable via the input port and only readable via the one or more processors. In certain embodiments, the one or more processors can include a processor configured external to the I/O port, the processor including machine learning capabilities and configured to: analyze data traffic passing through the I/O port; perform data-type classification of the data traffic; and take a remedial action upon detecting data traffic containing data corresponding to an unauthorized data-type classification. The data-type classification can include an image data classification, video data classification, audio data classification, or text-data classification.

This summary is not intended to identify key or essential features of the claimed subject matter, nor is it intended to be used in isolation to determine the scope of the claimed subject matter. The subject matter should be understood by reference to appropriate portions of the entire specification of this disclosure, any or all drawings, and each claim.

The foregoing, together with other features and examples, will be described in more detail below in the following specification, claims, and accompanying drawings.

BRIEF DESCRIPTION OF THE DRAWINGS

Aspects, features and advantages of embodiments of the present disclosure will become apparent from the following description of embodiments in reference to the appended drawings.

DETAILED DESCRIPTION

Figure 1:
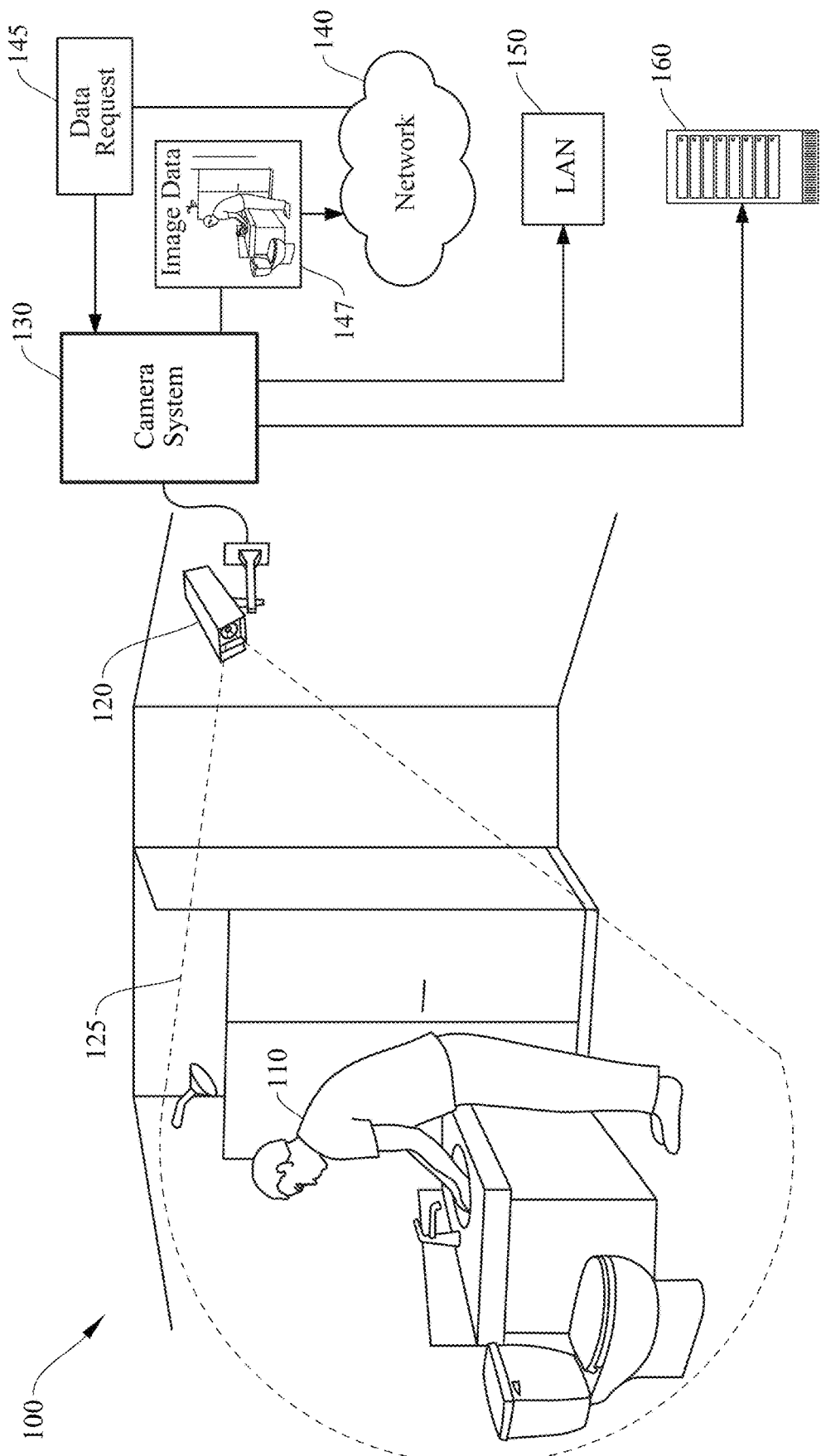
FIG. 1 shows how a conventional camera system may be used in a private location.

Aspects of the present disclosure relate generally to home security systems, and in particular to video camera systems configured for monitoring a data sensitive environment.

In the following description, various embodiments of a system for configuring a smart home system will be described. For purposes of explanation, specific configurations and details are set forth in order to provide a thorough understanding of the embodiments. However, it will be apparent to one skilled in the art that certain embodiments may be practiced or implemented without every detail disclosed. Furthermore, well-known features may be omitted or simplified in order to prevent any obfuscation of the novel features described herein.

As a general non-limiting overview, certain embodiments of the present invention relate to a data-secure sensor system that can perform video surveillance and provide video analysis information to an authorized user, while safeguarding the video content (e.g., video or images) from being accessed externally by an outside entity. By way of example, a system can take video imagery of an area, perform image analysis to determine the presence or pose (e.g., position and/or orientation) of a person or object in the area, and answer user text-based queries related to the image analysis (e.g., is someone in the room?) without releasing the images to any external entity. Some embodiments can ensure this inaccessibility by configuring a hardware choke between the sensor system and any input/output (I/O) pins that provides a low-speed data bus (e.g., 15 kbps), such that any attempt to download raw video data would be severely slowed to the point where a single image of video could take days to download. Alternatively or additionally, some embodiments may further monitor data traffic for structured image data, such that even if a user attempts to download the raw video, the image data can then be quickly identified and remedial action may be taken. Some remedial actions can include (1) reporting an attack on the system, (2) breaking the data connection between the data-secure sensor system and any external entities, (3) shutting down the entire system, (4) or the like, (5) or any combination thereof. In another implementation, a processor in a trusted environment (see, e.g., processor 310 of FIG. 4) can be isolated from incoming sensor data (and any memory where the data is stored), so that it does not have the capability to access raw sensor data. Put simply, some embodiments may be described as a sensor system (e.g., video camera system) that only provides information about raw sensor data (e.g., video data), without providing access to the raw data itself. In addition to the use of artificial intelligence, some implementations may employ machine learning to improve the system's ability to identify particular individuals or other objects or activity. Information about stored video can be provided in response to user inquiries or automatically (e.g., periodically reporting a room status or auto-alert in response to certain detected activity). Thus, user can monitor highly sensitive areas such as bedroom or a location of a safe and obtain information about the area through queries (e.g., is anyone present?, is someone interacting with the safe?, etc.) or auto-reporting without ever disclosing any actual video content. In some cases, other inputs such as microphones, sensors (e.g., touch or force sensors) may be incorporated into the query based reporting scheme, all of which being described in more detail in the exemplary non-limiting embodiments that follow.

FIG. 1 shows how a conventional camera system may be used in a private location 100. Private location 100 is a bathroom with sink, toilet, and shower. A user 110 is shown washing his hands in the sink. Camera 120 records video of an area 125 of private location 100, which is coupled to camera system 130. Camera system 130 can include circuitry to process the raw video data, perform image analysis to identify objects and/or activity, memory to store the raw video and image analysis data, and a communication system to communicate with/to a cloud-based network 140, a local area network (LAN) 150, and a local host server 160 (or other external entity). In the example shown, camera system 130 receives a data request 145 regarding private location 100 from an entity on cloud-based network 140. In response, camera system 130 provides image data 147 corresponding to the recorded video of area 125 to the requesting entity via network 140.

Compared to most methods of detection, video cameras often provide the most useful and reliable data, which can be important in certain applications. For example, as described above, it can be very important to know whether vulnerable individuals (e.g., small children, developmentally disabled, or dependent elderly) are safe or need assistance in areas that are not typically under safe supervision by care providers. However, given the risks of unauthorized access via data security breaches (e.g., hacking), particularly in widely accessible, non-closed networks as shown in FIG. 1, many would feel that the risks outweigh the benefits and opt not to include a video-based security system in highly sensitive areas where privacy is paramount.

Figure 2:
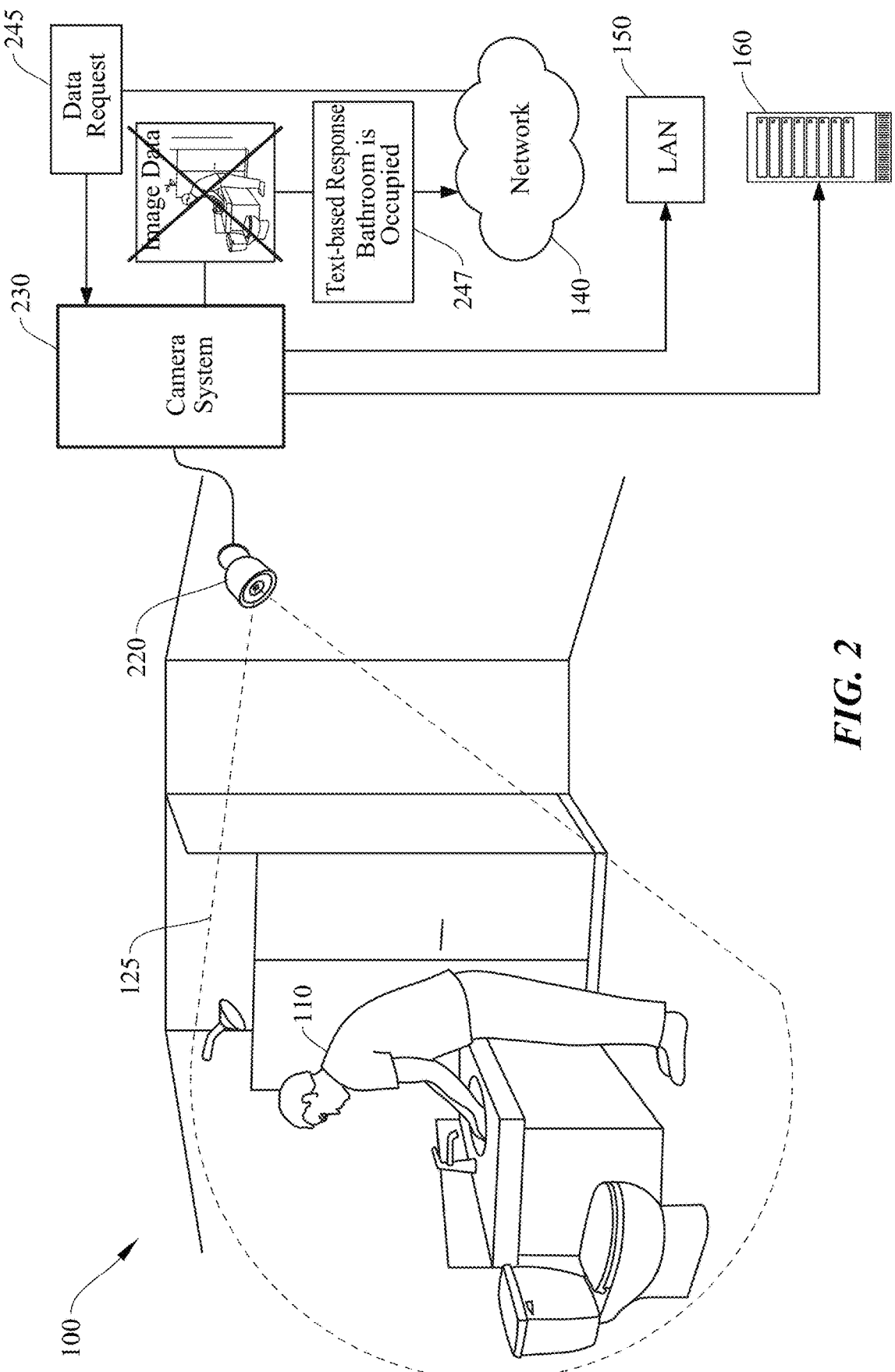
FIG. 2 shows how a data-secure sensor system can be used in a private location, according to certain embodiments.
Figure 3:
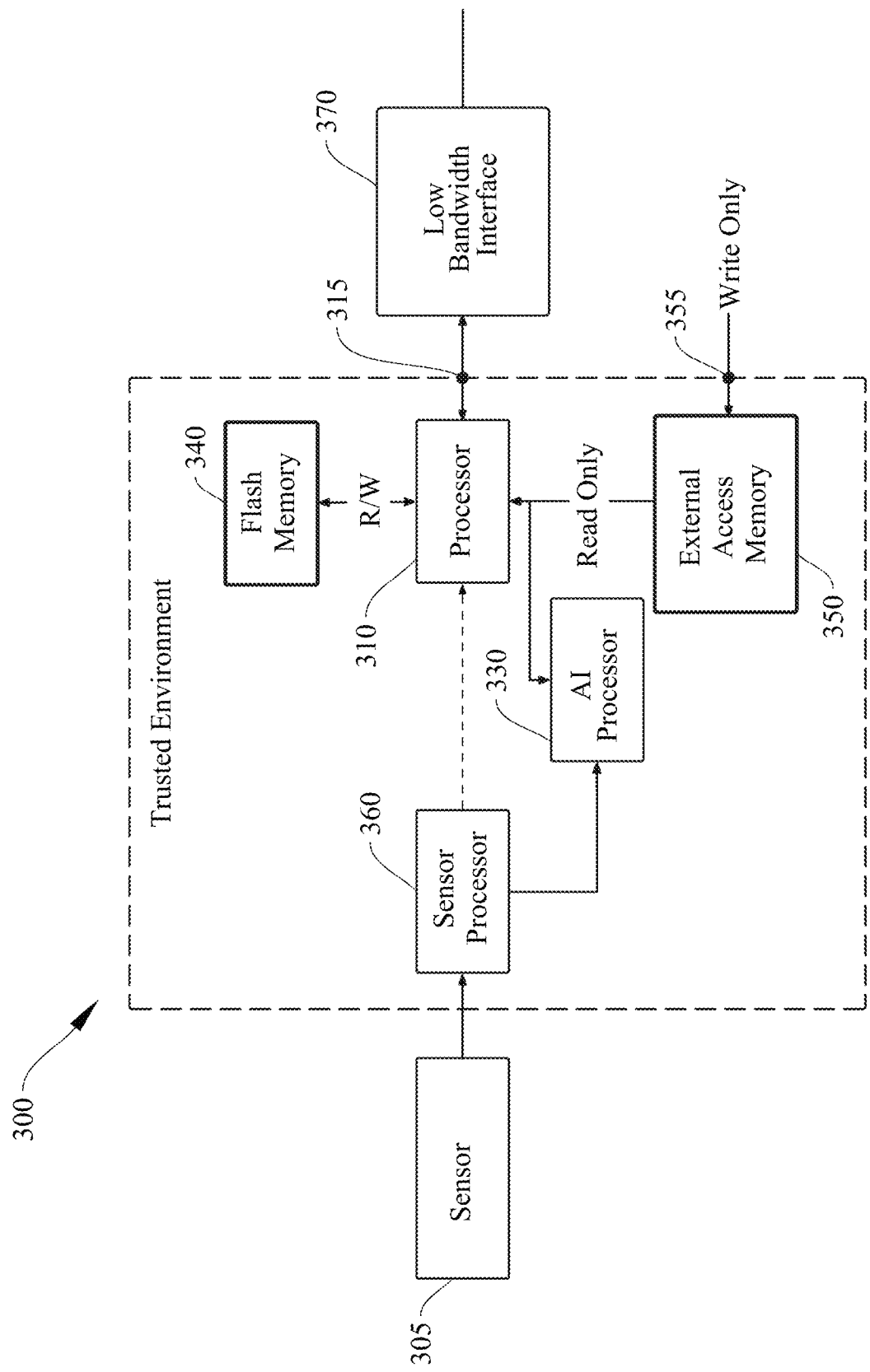
FIG. 3 shows a simplified block diagram of a trusted environment in a data-secure sensor system, according to certain embodiments.
Figure 4:
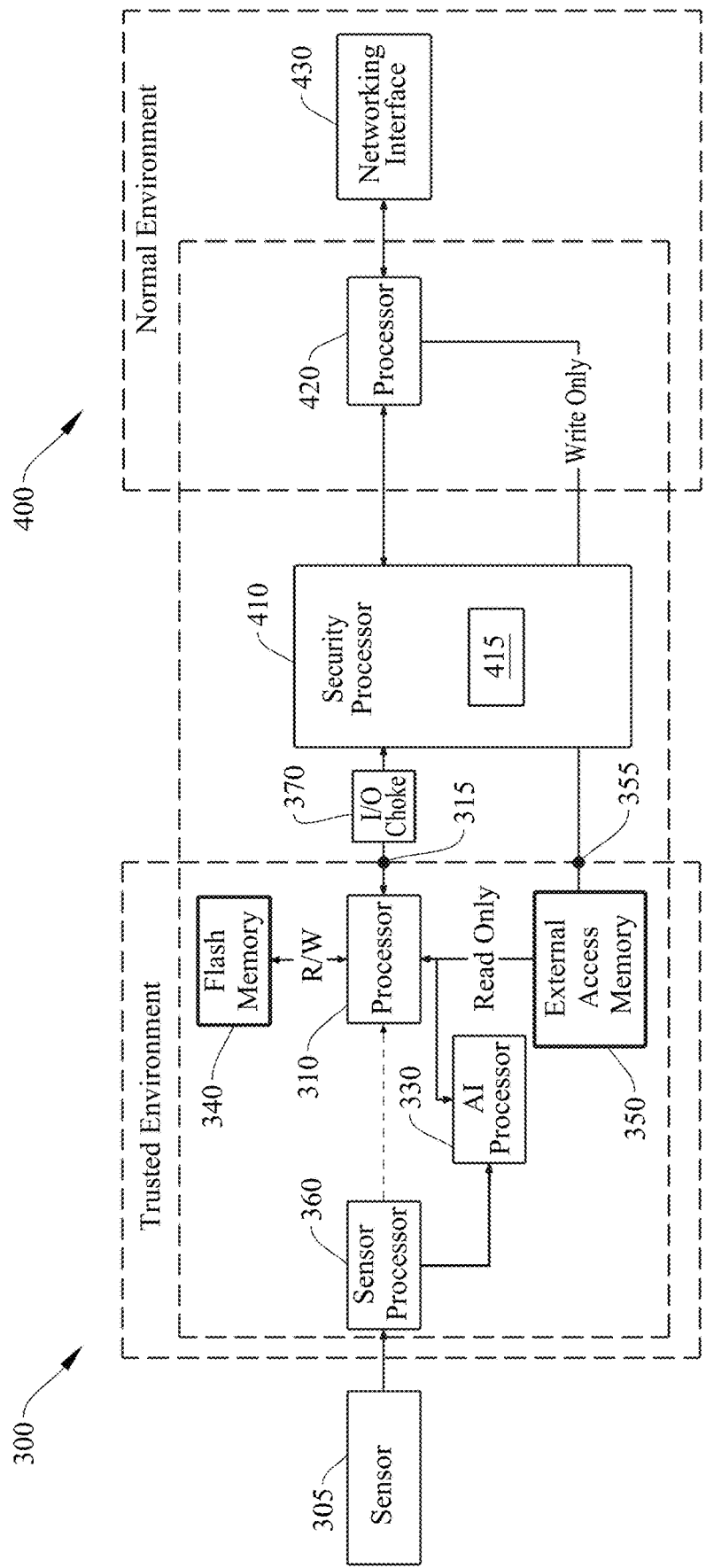
FIG. 4 shows a simplified block diagram of trusted environment of a data-secure sensor system interfaced with a normal environment, according to certain embodiments.
Figure 5:
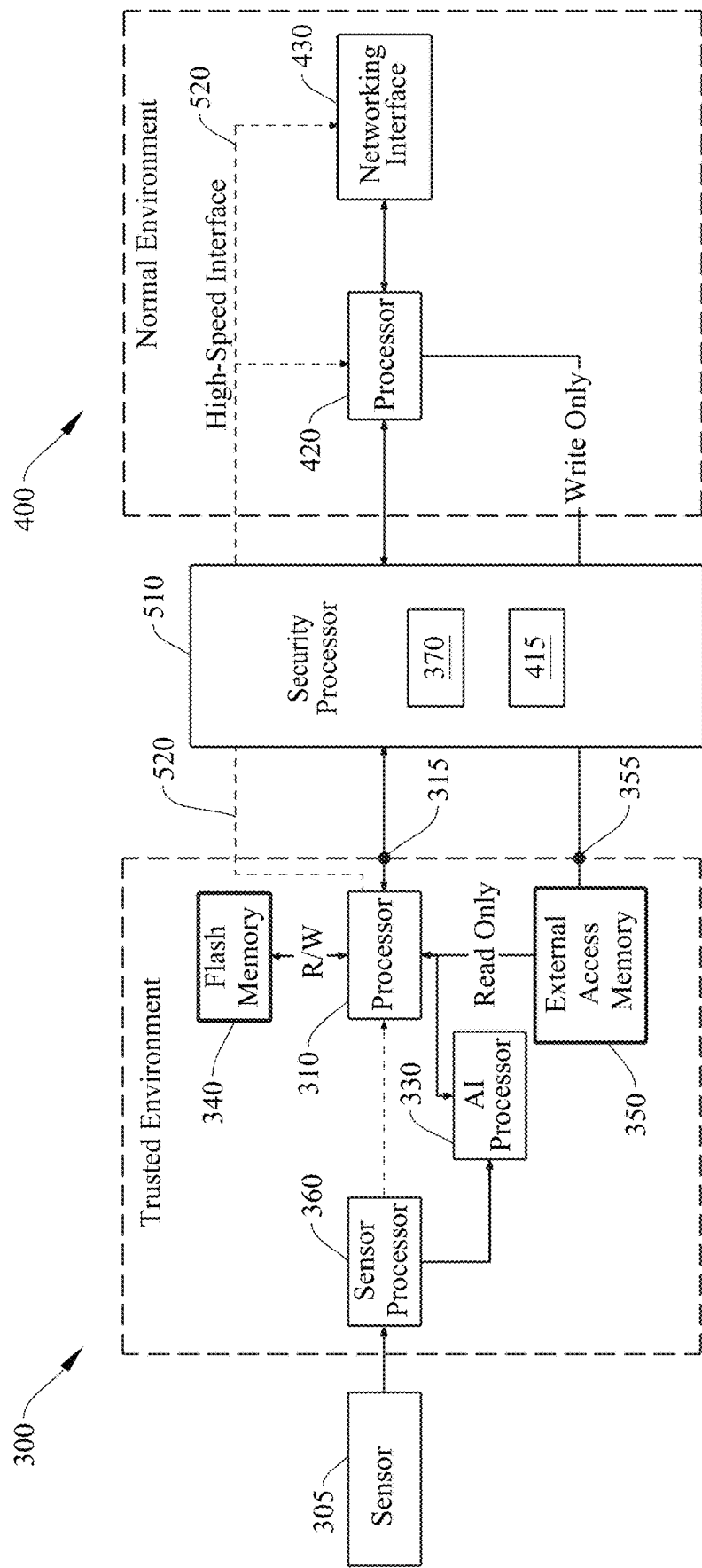
FIG. 5 shows a simplified block diagram of a data-secure sensor system with an enhanced image transfer monitoring system (SEP) with high bandwidth communication capabilities, according to certain embodiments.

FIG. 2 shows how a data-secure sensor system 200 can be used in a private location 200, according to certain embodiments. Private location 200 is a bathroom with sink, toilet, and shower. A user 210 is shown washing his hands in the sink. Sensor (e.g., camera) 220 records video of an area 225 of private location 100, which is coupled to camera system 230. For purposes of explanation, the sensor(s) and corresponding system are shown and described as a "camera" system, but it would be understood by those of ordinary skill in the art that other types of sensors (e.g., audio, vibration, touch, etc., or a combination thereof) can be used in the embodiments described herein. Camera system 230 can include circuitry to process the raw video data, perform image analysis to identify objects and/or activity, memory to store the raw video and image analysis data, a communication system to communicate with to a cloud-based network 140, a local area network (LAN) 150, and a local host server 160 (or other external entity), and one or more hardware, firmware, and/or software-based implementations for preventing image data from being accessible by any entity external to a "trusted environment." In some cases, the trusted environment (e.g., as shown in FIGS. 3-5) may be limited to the confines of camera system 230 or a subset thereof (e.g., not including network 140, LAN 150, or local host server 160. Some implementations of camera system 230 and corresponding trusted environments are described below with respect to FIGS. 3-6.

Referring back to FIG. 2, camera system 230 receives a data request 245 regarding private location 200 from an entity on cloud-based network 240. As described in further detail below, camera system 230 can be configured to respond to inquiries about video content, but does not provide any video data to any entity or location external to the trusted environment. In some embodiments, a hardware choke may be configured on one or more input/output (I/O) ports of camera system 230 and can be operable to limit a communication bandwidth through the hardware choke (also referred to as an "I/O choke") to a maximum data rate that is set between 10 kbps and 20 kbps. Other maximum data rates are possible (e.g., useable maximum data rates can range from 5 kbps to 100 kbps), but should be set such that the hardware choke allows low-bandwidth communications (e.g., alphanumeric text) to occur relatively unimpeded, while stopping or effectively stopping high-bandwidth communications, such as transferring image data, from propagating outside camera system 230. Alternatively or additionally, some embodiments may further monitor data traffic for structured image data, such that even if a user attempts to download the raw video through a hardware choke, the image data can be quickly identified and remedial action may be taken. Some remedial actions can include breaking the data connection between camera system 230 and any external entities, powering down camera system 230, sending an alert to authorized users of system 230, or the like.

Referring again to FIG. 2, in response to receiving the request 245, camera system 230 blocks the transmission of any image data (whether requested or not) and sends a descriptive response 247 to the requester. The descriptive response (also referred to as "descriptive data") can be any suitable non-image-based response to any queries of data request 245 including responses that identify whether private location 200 is occupied, who is present, what activities are occurring, and the like. That is, a descriptive response can be a description of content captured by the camera system (or other type of sensor system such as an audio system) that is different from the content (e.g., video data or other sensor data). An example of a descriptive response can be a text-based response. Camera system 230 may include controls to limit the types of questions that can be asked and to what extent questions may be answered. For example, using image analysis, camera system 230 may determine that user 210 is using the sink, but may only report that the bathroom is occupied, rather than give more particular information. In some cases, there may be a hierarchy of authorized requesters, such that some entities (e.g., owner of a home) may be privy to more detailed information than others. For instance, a request for information about the sensor data may include some encrypted indication that identifies a level of authorization for the request/requestor. In each case, however, image data (or more generally, sensor data) is not presented to the requestor (as shown).

FIG. 3 shows a simplified block diagram of a trusted environment 300 in a data secure camera system, according to certain embodiments. Trusted environment 300 can include processor 310, sensor processor 360 (e.g., image signal processor), artificial intelligence (AI) processor 330, memory (or "memory block") 340, and external access memory 350. Sensor 305 can be coupled to sensor processor 360. Some embodiments may employ additional sensors (e.g., microphones—not shown) and corresponding sensor processing blocks, as further discussed below with respect to FIG. 4. Low bandwidth interface 370 may be coupled to processor 310 and may operate as the sole interface for receiving and responding to externally-based inquiries about content received from sensor 305. In the embodiments described herein, sensor 305 is often described as a video camera (image sensor), but any suitable sensor or sensors can be used including different types of sensors not limited to an audio sensor, heat sensor, vibrational sensor (e.g., accelerometer); or any other sensor or sensors as would be appreciated by one of ordinary skill in the art with the benefit of this disclosure. Similarly, sensor processor 360 may be any suitable dedicated or general processor configured to process data provided by sensor(s) 305, such as image signal processors, audio signal processors, or the like.

Sensor 305 may include any suitable image sensor technology including, but not limited to, complementary metal-oxide-semiconductor (CMOS)-based, depth sensing cameras and variants, and charge-coupled device (CCD) cameras. In some embodiments, multiple cameras can be used with multiple video feeds being applied to trusted environment 300. Alternatively or additionally, camera 115 can be focused and directed (e.g., aimed) via software that controls optical characteristics of sensor 305. Sensor 305 can be electrically coupled to sensor processor 360, as further discussed below. Sensor 305 may be integrated within trusted environment 300 such that no external connections to sensor 305 are possible or practically feasible to further ensure a closed and secure data environment. In some cases, sensor 305 couples to sensor processor 360 through any suitable coupling means including embedded display port, low-voltage differential signaling (LVDS), mobile industry processor interface (MIPI), or other suitable formats, as would be appreciated by one of ordinary skill in the art with the benefit of this disclosure.

Sensor processor 360 can be configured to receive raw video data from sensor 305 and perform image sensor processing. Image sensor processing can include color filtering (e.g., demosaicing), autofocus, exposure, white balance, vignetting, color shading, noise reduction, video encoding, and the like, as would be appreciated by one of ordinary skill in the art with the benefit of this disclosure.

Sensor processor 360 may be configured to feed a processed video feed to AI processor 330, according to certain embodiments. AI processor 330 can be a specialized machine learning (ML) co-processor or core to analyze video data for facial recognition, understanding voice commands (e.g., for microphone inputs), understanding natural language requests, recognizing user's voices based on speech patterns and audio characteristics, further image processing, and the like. In some embodiments, AI processor 330 may be an inferential engine, training engine, or combination thereof. AI processor 330 may be a convolutional neural network, although other ML-type neural networks are contemplated. In some cases, video data processed at AI processor 330 or sensor processor 360 can be stored in memory 340 via processor 310. In alternative embodiments, image/video data is not stored in memory that is directly accessibly to processor 310. In such cases, there can be a third (or more) memory block with read/write access connected only to AI processor 330.

Processor 310 may include one or more processors or processing cores. In some embodiments, processor 310 can include a general purpose primary processor as well as one or more special purpose co-processors such as graphics processors, digital signal processors, or the like. Alternatively or additionally, processor 310 can be implemented using customized circuits, such as application specific integrated circuits (ASICs) or field programmable gate arrays (FPGAs). In some embodiments, such integrated circuits execute instructions that are stored on the circuit itself and/or in memories 340, 350, as further described below.

Processor 310 may operate to receive and process inquiries from external sources, control storage and retrieval of image data and/or image contextual analysis data from memory 340, control read/write processes for memory 340, read from memory 350 for firmware updates, training data, and the like. Inquiries are typically received from external sources through low bandwidth interface 370 and can relate to analyzed image/video data stored in memory 340. For instance, inquiries may include questions such as "is there anyone present in the room," "who is present in the room," "has anyone been in this room in the last 24 hours," and the like. A non-limiting list of inquiries may relate to room occupancy, what recognized objects are in the room, whether there has been movement or a type of movement (e.g., person/object pose, gestures, multiple objects/persons detected, etc.), environmental conditions for a room (e.g., are the lights on), whether a specific action and/or event has occurred (e.g., has a person fallen or exhibiting behavior indicative of distress?), and the like. In some implementations, processor 310, AI processor 330, and sensor processor 360 may be separate entities, or may be combined together as a single integrated circuit in any suitable combination. In certain embodiments, processor 310 may interpret requests from a user. Alternatively or additionally, an API (application programing interface) may be used (e.g., in conjunction with processor 310) to allow requests for particular types of information (e.g., requests for descriptions of sensor content).

Some embodiments may be more restrictive about questions relating to stored image or video content than others, but in each case the actual image or video is not shared or exported out of the trusted environment. Some embodiments may employ a hierarchical structure where certain users (e.g., home owner) may ask specific questions having a higher particularity with respect to detected activity in a room (e.g., identifying a particular person in a room, identifying a pose of a person or thing in the room, identifying gestures or hand/body configurations, etc.), and lower-tiered users may have a more limited scope of available questions or particularity (e.g., activity reported, but no identified individuals). A pose can be a position of a person or object, an orientation of the person or object, or a combination thereof. The position may relate to where the person or object is located, for instance, in a room or area. The orientation may related to a direction the person or object is facing in one, two, or three dimensions. In some cases, the way the system responds when a lower-tiered user askes a restricted question might change. For example, in some embodiments, a user without any permissions may ask "Is a particular user in the room?," and the system may respond with "You don't have permission to ask that question." In another embodiment, the same user may the same question, but this time the response may be "there is no one in the room" or "there are two people in the room." In other words, a user with a lower tiered hierarchy may be given no response, or a limited response with some abstraction of detail, as exemplified in the scenarios above. Alternatively or additionally, the response may be encoded (e.g., binary code, code for a lookup table, etc.) and/or categorized in a particular way. For instance, some systems may bin suitable responses to a category such as "person present," "activity detected," "gesture type 1 detected," etc. In some cases, using the hierarchy method described above, some users may receive more specific and detailed feedback (e.g., "Travis has been sitting on the couch for the past 3.5 hours and is accessing media content and has altered HVAC settings), while others may get generic responses (e.g., "a person is present in the room'). One of ordinary skill in the art with the benefit of this disclosure would appreciate the many modifications, variations, and alternative embodiments thereof.

In some cases, processor 310 may operate in conjunction with AI processor 330 to answer inquiries about recorded or live video. For instance, a user may get an alert that there is motion in a room by sensor 305. A user may ask if a person is in the room and ask trusted environment 300 to identify the user. AI processor 330 may access previously stored video (e.g., stored in memory 340) or live video received in real-time to perform face recognition algorithms, process voice commands and natural language inquiries, further image processing, or other learned or trained activities to determine an appropriate answer to the inquiry. As indicated above, AI processor 330 may be a separate entity or may be subsumed by processor 310.

In alternative embodiments, in the case where the system has been configured to evaluate a specific question or task, AI processor 330 may output the answer to this question to processor 310, which may store this output in a log in Memory 340. Then, when a user asks that question of the system at a later time, processor 310 may access the log and respond with the previously stored result. Thus, questions about actions or activities that occurred in the past can be answered without relying on storing image or video data in any way. In some implementations, video and/or image data may be used for evaluating questions (in some cases, an automated battery of questions) and storing the results in memory 340, thereby allowing the video/image data to be deleted immediately afterward (or other suitable time frame) to further improve the robustness of the data security in the trusted environment.

Processor 310 may further control read/write functions on memory 340. For example, processor 310 can operate as a memory controller. Processor 310 may write image data and/or contextual analysis data (also referred to as "image analysis data") to memory 340. Image data and image analysis data may be received from sensor processor 360 (e.g., for images without context) or AI processor 330 (e.g., images with contextual analysis including identified occupants in a surveilled room). Processor 310 may also read from memory 340. For example, processor 310 may access (read) image data to be routed to AI processor 330 for further analysis. In another example, processor 310 may access stored image analysis data to respond to a user inquiry. Received inquiries and responses thereto are passed through low bandwidth interface 370, as further discussed below. According to certain embodiments, processor 310 may be the only entity configured to interface with (e.g., read/write to) memory 340 to ensure that sensitive data (e.g., video data) cannot be externally accessible via any other entity, I/O port, or the like. In some embodiments, processor 310 may be configured to read external access memory 350, as further described below. Processor 310 may further be configured to ignore requests for image data, shut down the communication link with an outside entity (e.g., through low bandwidth interface 270) in response to such requests, alert certain entities of such requests (e.g., alert a user, homeowner, etc.), or recognize the structure of image data passing through I/O port 315 and take appropriate actions (e.g., shut down the communications link, issue an alert, shut down the trusted environment completely and reboot, etc.), as would be appreciated by one of ordinary skill in the art with the benefit of this disclosure.

Memory 340 can include one or more memory units operable to store data (e.g., image data) and instructions that are executable by processor 310 or other processing unit(s) within trusted environment 300. Memory 340 can be a read-and-write memory device or a volatile read-and-write memory, such as dynamic random access memory. Memory 340 can include any combination of computer readable storage media including semiconductor memory chips of various types (DRAM, SRAM, SDRAM, flash memory, programmable read-only memory) and so on. The computer readable storage media do not include carrier waves and transitory electronic signals passing wirelessly or over wired connections.

External access memory 350 may be configured to store firmware update data, training data, or the like, according to certain embodiments. External access memory 350 may be accessed as a read-only interface by processor 130 and a write-only interface via I/O pin 355. Limiting processor 130 to only read commands to external access memory 350 can help prevent image data from leaving trusted environment 300 via I/O pin 355. Further, limiting write commands to eternal access memory 350 through I/O pin 355 allows external access memory 350 to receive various updates to firmware, configuration data, etc., from external sources to update trusted environment 300, without creating a new data access point for external entities. Thus, external access memory 350 operates as a one-way input (e.g., external write commands through I/O pin 355) and a one-way output (e.g., internal read commands via processor 310). In some cases, the firmware and/or configuration data updates may modify aspects of processor 310, AI processor 330, sensor processor 360, or any entity within trusted environment 300, as would be appreciated by one of ordinary skill in the art with the benefit of this disclosure.

In some embodiments, external access memory 350 may serve primarily as an isolation tool to further inhibit the possibility of unintended image/video data from leaving the device. By physically isolating memory 350 from memory 340 and preventing processor 310 from writing to memory 350, this may serve to guarantee that image/video data cannot be accidentally or intentionally stored on memory 350. In such configurations, even if an unauthorized user were to compromise memory 350 in a way that allowed the contents of memory 350 to be read externally (e.g., from outside of the trusted environment), there would be no risk of leaking sensor data. Certain configurations (e.g. where training data that is shared with the device is encrypted) may also allow port 355 from memory 350 to processor 420 to have bidirectional communication. In some cases, external access memory may be utilized to allow for training data to be abstracted at different feature levels, and then propagated to multiple devices. For example, some productized systems may be shipped with training data designed to recognize facial features. Once a user begins using the system and configures it to train on them specifically, the system can generate new training data that recognizes the user's specific face. This new training data may be propagated to other devices (e.g., devices owned by the user) an may be stored in the external access memory.

Low bandwidth interface 370 may operate to limit a data rate into and out of I/O pin 315 to a value that readily allows text basted inquiries to pass relatively unimpeded, but can severely limit or effectively halt the transfer of high bandwidth data (e.g., image data), according to certain embodiments. For example, some high resolution images may take many hours or possibly days to transfer across a 15 kbps interface, assuming processor 310 could be configured to attempt to route said image data to I/O port 315 (e.g., via unauthorized access (hack)). In some cases, low bandwidth interface 370, also referred to as "I/O choke 370," typically has a maximum data rate that can range anywhere from 5 kbps and 100 kbps. Other maximum data rates are possible (e.g., higher or lower than 5-100 kbps). In exemplary embodiments, the maximum data rate can be approximately 15 kbps. In some cases, I/O choke 370 may be a single wire.

Alternatively or additionally, embodiments may include creating a hardware limitation on the clock speed of the communication bus (see, e.g., the SPI communications bus example below), limiting the clock speed of processor 310, limiting the read speed of memory 340 (e.g., even if port 315 is capable of higher data rates, it is limited by how fast it can pull information from 340).

In some cases, a 1-wire bus may be implemented on I/O Port 315, and I/O choke 370 may be the functional/physical limitations of that bus. In the case of I/O choke 370 being a single wire, this can be understood to be (I/O port 315/IO choke 370) a 1-wire communication bus, which may be configured to limit the possible data rate by removing the possibility of having a separate clock, and instead requiring that the clock be embedded (and subsequently recovered on the receiving side) within the data line. This configuration may set a maximum possible clock rate and therefore a maximum bandwidth. Typical 1-wire interfaces operate at ~15 kbps, with the absolute maximum data rates topping out at ~150 kbps, although other ranges are possible, as described above. In such cases, even if IO port 315 were to be compromised and a custom communication protocol were implemented, there is still a maximum data rate enforced that is still slow enough to be considered a sufficient choke for image/video data in the manner described throughout this disclosure.

To illustrate certain advantages of such systems, consider a system configured in such a way that I/O Port 315 implemented an SPI communication bus (e.g., clock, Miso, Mosi) and the IO Choke was implemented by enforcing a maximum clock rate of 10 kHz. This could limit the maximum data rate of the system in a comparable way. But, if the system were compromised and an unauthorized user was able to change the maximum clock rate to a high value (e.g., 20 MHz) then the data rate would no longer be limited sufficiently to protect against the transmission of image/video data. Potential protections for systems that have a multi-wire communication port may include using an e-fuse to fix the configuration settings of the clock speed (e.g., set certain efuses that when blown short to electric ground such that the system then uses the number of efuses blown as the divider value for the clock frequency). Thus, if an unauthorized user were able to comprise the system, the only operation they would have available to them is blowing more e-fuses, which would continue to lower the clock frequency, thereby lowering the available bandwidth.

In some embodiments, I/O choke 370 may be located outside the trusted environment and coupled to I/O port 315, as shown. Alternatively, I/O choke 370 may be integrated with (e.g., an I/O port of processor 310) or part of trusted environment 300. I/O choke 370 may be coupled to security processor 410, as further described below with respect to FIG. 4. Alternatively or additionally, I/O choke 370 may be integrated with a security processor, as shown in FIG. 5 (see I/O choke 515 in SEP 510). In some cases, multiple I/O chokes or an adjustable bandwidth I/O choke may be implemented. It should be noted that although a particular number of discrete entities are shown in trusted environment 300, additional functions and/or components may be added (e.g., additional processors, memory resources, audio/sensor processing units, etc.) or may already be included but not shown (e.g., data busses) in order to not obfuscate the focus of the invention with details that may not necessarily be germane to the focus of the present disclosure, as would be appreciated by one of ordinary skill in the art with the benefit of said disclosure. Some components may be combined with other components in certain implementations. For instance, processor 310, sensor processor 360, and AI processor 330, or any combination thereof, may be formed on a common integrated circuit.

As described above, trusted environment 300 provides a data-secure camera system that can provide useful surveillance information about recorded image data in an area of interest while maintaining the confidentiality of the raw image data itself by preventing external access to said image data. Thus, areas that may have highly sensitive information or activity, such as a bathroom, room with a safe, bedroom, baby room, etc., may be safely surveilled without any material risk of a data breach, as the image data is not made available to any external I/O ports of trusted environment 300.

FIG. 4 shows a simplified block diagram of trusted environment 300 of a data-secure camera system interfaced with a normal environment 400, according to certain embodiments. Trusted environment 300 can be similar to the trusted environment shown in FIG. 3, with the inclusion of additional input(s) and corresponding sensor processor(s). For example, in additional to sensor 305, trusted environment 300 may include one or more microphones or other sensor(s) (e.g., temperature sensors, humidity sensors, etc.) and one or more sensor processor(s) 360 to process the data from the additional input(s). In some embodiments, sensor processor 360 may be subsumed by sensor processor 360, processor 310, AI processor 330, or a combination thereof. Sensor 305 can be communicatively coupled to sensor processor 360. Microphone(s) 305(2) and sensor(s) 305(3) can be communicatively coupled to sensor processor 360. Sensor processor 360 may be communicatively coupled to AI processor 330 and/or processor 310 (connection not shown).

Normal environment 400 may be any computing interface requesting access to data from trusted environment 300. For example, normal environment 400 may include mobile devices (e.g., tablet computer, smart phones, smart wearables, remote controls, laptop computers, etc.), desktop computer, server computers, or other suitable computing device, as would be appreciated by one of ordinary skill in the art with the benefit of this disclosure. Referring to FIG. 5, normal environment 400 can include processor 420 and networking interface 430. Processor 420 may include one or more processors or processing cores. In some embodiments, processor 420 can include a general purpose primary processor as well as one or more special purpose co-processors such as graphics processors, digital signal processors, or the like. In some embodiments, processor 420 can be implemented using customized circuits, such as application specific integrated circuits (ASICs) or field programmable gate arrays (FPGAs).

In some embodiments, networking interface 430 can provide voice and/or data communication capability for processor 420. In some embodiments, communication interface 430 can include radio frequency (RF) transceiver components for accessing wireless voice and/or data networks (e.g., using cellular telephone technology, data network technology such as 3G, 4G/LTE, Wi Fi, other IEEE 802.11 family standards, or other mobile communication technologies, or any combination thereof), components for short range wireless communication (e.g., using Bluetooth and/or Bluetooth LE standards, NFC, etc.), and/or other components. In some embodiments networking interface 430 can provide wired network connectivity (e.g., Ethernet) in addition to or instead of a wireless interface. Networking interface 430 can be implemented using a combination of hardware (e.g., driver circuits, antennas, modulators/demodulators, encoders/decoders, and other analog and/or digital signal processing circuits) and software components. In some embodiments, networking interface 430 can support multiple communication channels concurrently or at different times, using the same transport or different transports. In certain embodiments, normal environment 400 represents any source of communication outside of trusted environment 300.

In some embodiments, inquiries about the content of image data generated by sensor 305 and/or the sensor data from inputs 305(2) and (3) may originate from normal environment 400. More particularly, users may request information about image data captured in trusted environment 300 (e.g., "is someone present in the bathroom") via a user interface (not shown) coupled to processor 420, over a wireless connection to processor 420 via networking interface 430, or other suitable means of communication. In some cases, inquiries may be automatically generated. For instance, some inquiries may be automated to request information about image data at a particular frequency (e.g., every 10 minutes, every day, etc.), in response to particular events (e.g., a home alarm has been activated or deactivated), or the like.

Security processor 410 can operate as a monitor for any communications to and from trusted environment 300 via I/O port 315 and may enforce of the text-based communication protocol between the outside world (e.g., processor 420) and trusted environment 300 by identifying any structured image data passing from trusted environment 300 to normal environment 400 and, in response to identifying image data, taking an appropriate action. Image data may be detected based on the content of the inquiry (e.g., requests for raw image data) or from the content of data moving between trusted environment 300 and normal environment 400. For instance, image data is typically structured such that certain heuristics and statistical models may be applied to communication data (or any data) to identify image data (e.g., discrete or integrated/modulated with composite data) with a high confidence, as would be understood by one of ordinary skill in the art with the benefit of this disclosure.

For example, with respect to heuristics and statistical models, some implementations may utilize cluster classification or clustering, which is the process of taking unallocated clusters of information and putting them into different categories. Some techniques for file-type identification are keyword/pattern matching, fingerprinting, statistical analysis, and machine learning. Keyword/pattern matching can relate to searching for special byte sequences and their location within a file. This may be useful because many file types can have headers/footers which describe their format, like magic numbers, which are a byte sequence at the beginning of a file. For example, JPEG images begin with 0xFFD8, known as the Start of Image marker (SOI).

In fingerprinting, unique fingerprints can be generated from different file types, and unknown data is then compared against these fingerprints. Types of fingerprints systems include Byte Frequency Distribution (BFD) and Byte Frequency Cross-Correlation (BFC). In statistical analysis, some aspects include analyzing more than the header/footer of files. Building statistical models of file types using techniques described above can include comping a centroid model using the mean and standard deviation of the BFD. In machine learning, clustering and feature extraction may be used in machine learning based implementations, which can be configured to incorporate some or all of the above examples in singular models.

In some embodiments, security processor (SEP) 410 may monitor and enforce the communication protocol (e.g., text-only communication) in a number of different ways. Thus, even if image data bypassed the protections of processor 310 (e.g., instantiating text-only communication protocols) and traversed low bandwidth interface 370 via I/O pin 315, SEP 410 can readily identify the image data before any material amount (e.g., enough to render a single image) is transferred to an external destination (e.g., processor 420 of normal environment 400) and take action. For example, SEP 410 may cause the communication channel between trusted environment 300 and normal environment 400 to be immediately shutdown. Some embodiments may automatically shutdown said communication channel after a period of time (e.g., 1 minute, 10 minutes, etc.), as most text-based communication would take less than 1 minute to process and any unidentified image data transfer would be interrupted. The automatic shutdown can be use-defined, set by default, or calculated based on historical data traffic content, transfer times, or the like. Alternatively or additionally, upon detection of image data or in response to data transfers beyond a threshold time value, SEP 410 may turn off some or all aspects of trusted environment 300, reprogram trusted some or all aspects of trusted environment 300 from a secure boot program (e.g., stored in external access memory 350), issue an alert (e.g., alert a user that image data has been or is being compromised), rewrite firmware and reboot the system, request verification of the data transfer from an authorized user (e.g., home owner), request that the data transfer requester reissue the request and start over, temporarily close the communication channel and request that the source restate the inquiry, and the like, as would be appreciated by one of ordinary skill in the art with the benefit of this disclosure.

By way of example, in some implementations, if the SEP is triggered, it may cause the trusted environment to erase some or all configuration/firmware changes and reset to the original signed firmware/configuration that was shipped with the device. This may be in response to the SEP determining that the trusted environment has been or has a high probability (e.g., 70% change—other probability thresholds can be used) that it has been compromised and that any subsequent operations (prior to reset) performed by the trusted environment are not to be trusted and/or allowed.

In another example, if the SEP is triggered and suspects that a request (even if just for a text-answer) may have come from an unverifiable or unallowed sourced (e.g. adversary (hacker) on an external network, or un-privileged or unauthorized user) the system may halt the communication with the trusted environment. In some cases, the system may then reach out to the administrator (e.g. authorized/paired device of owner, etc.) requesting confirmation that the request is valid and should be fulfilled. This may be similar to the process on some personal computers that pause an action and instantiating a popup message requiring an "admin" to provide a password to implement the desired action.

In some implementations, a processor in a trusted environment (e.g., processor 310) can be isolated from sensor data (and any memory where the data is stored), so that it does not have the capability to access raw sensor data.

SEP 410 may further secure provide secure boot data to external access memory 350 via I/O pin 355, store security keys, and operate as a cryptographically secure interface between trusted environment 300 and normal environment 400. In some embodiments, SEP 410 can be configured to scan communication data (e.g., write only data) from processor 420 to external access memory 350 through I/O port 355, as shown in FIG. 4. In a similar manner, SEP 410 may search for structured image data and may shut down the communication or other suitable action (as described above) upon detection of image data or for attempted read requests from external access memory 350. SEP 410 may be a separate entity, as shown, or may be a part of trusted environment 300 (e.g., subsumed by processor 310), a part of normal environment 400, or a combination thereof. One of ordinary skill in the art with the benefit of this disclosure would understand the many variations, modifications, and alternative embodiments thereof.

In certain embodiments, SEP 410 and/or external access memory 350 can be an integrated circuit or the like that can securely store cryptographic information for trusted environment 300, as noted above. Examples of information that can be stored within SEP 410 and/or external access memory 350 include long term public and secret keys (LTPKC, LTSKC), and a list of paired accessories (e.g., a lookup table that maps accessory ID to accessory long term public key LTPKA for accessories that have completed a pair setup or pair add process), or the like, as would be appreciated by one of ordinary skill in the art with the benefit of this disclosure. In some embodiments, cryptographic operations can be implemented in a cryptographic logic module 415. Cryptographic logic module 415 can include various logic circuits (fixed or programmable as desired) that implement or support cryptographic operations, including any or all cryptographic operations described above. One of ordinary skill in the art with the benefit of this disclosure would understand the many variations, modifications, and alternative embodiments thereof. It should be noted that SEP 410 may be configured within the "trusted environment" (although not necessarily depicted that way in the figures) in a typical embodiment, as it can serve a supervisory role over the rest of the trusted environment, as described herein. In some cases, SEP 410 may be exist on separate silicon (e.g., separate IC package) with respect to some or all of the other entities within a trusted environment (e.g., processor 310, sensor processor 360, AI processor 330, memories 340, 350, etc.), but may still be within the trusted environment 300.

FIG. 5 shows a simplified block diagram of a data-secure camera system with an enhanced image transfer monitoring system (SEP 510) with high bandwidth communication capabilities, according to certain embodiments. To simplify the explanation of the various embodiments herein, trusted environment 300 and normal environment 400 of FIG. 5 may be similar in system topology and operation as described above with respect to FIGS. 3 and 4, however one of ordinary skill in the art with the benefit of this disclosure would understand the many variations, modifications, and alternative embodiments thereof. Furthermore, in some embodiments, camera system 230 of FIG. 2 may encompass the trusted environments of the figures presented herein (e.g., FIGS. 3-5) and may further include the corresponding sensor(s) and low bandwidth interface, as would be appreciated by one of ordinary skill in the art with the benefit of this disclosure.

Some implementations may employ an additional unrestrained, high-bandwidth data bus 520 that may couple elements of trusted environment 300 to normal environment 400. For example, processor 310 may be configured to communicate with processor 420, networking interface 430, or other external entity via a communication channel (data bus 520) that is under the supervision of SEP 510. Thus, any of the mitigating responses (e.g., channel shutdown, trusted environment shutdown and reboot, etc.) may be instantiated by SEP 510 in response to detecting structured image data in data bus 520. In some cases, only authorized users (e.g., home owners, system administrators, etc.) may utilize data bus 520 by providing the appropriate authorization credentials, keys, etc.

Figure 6:
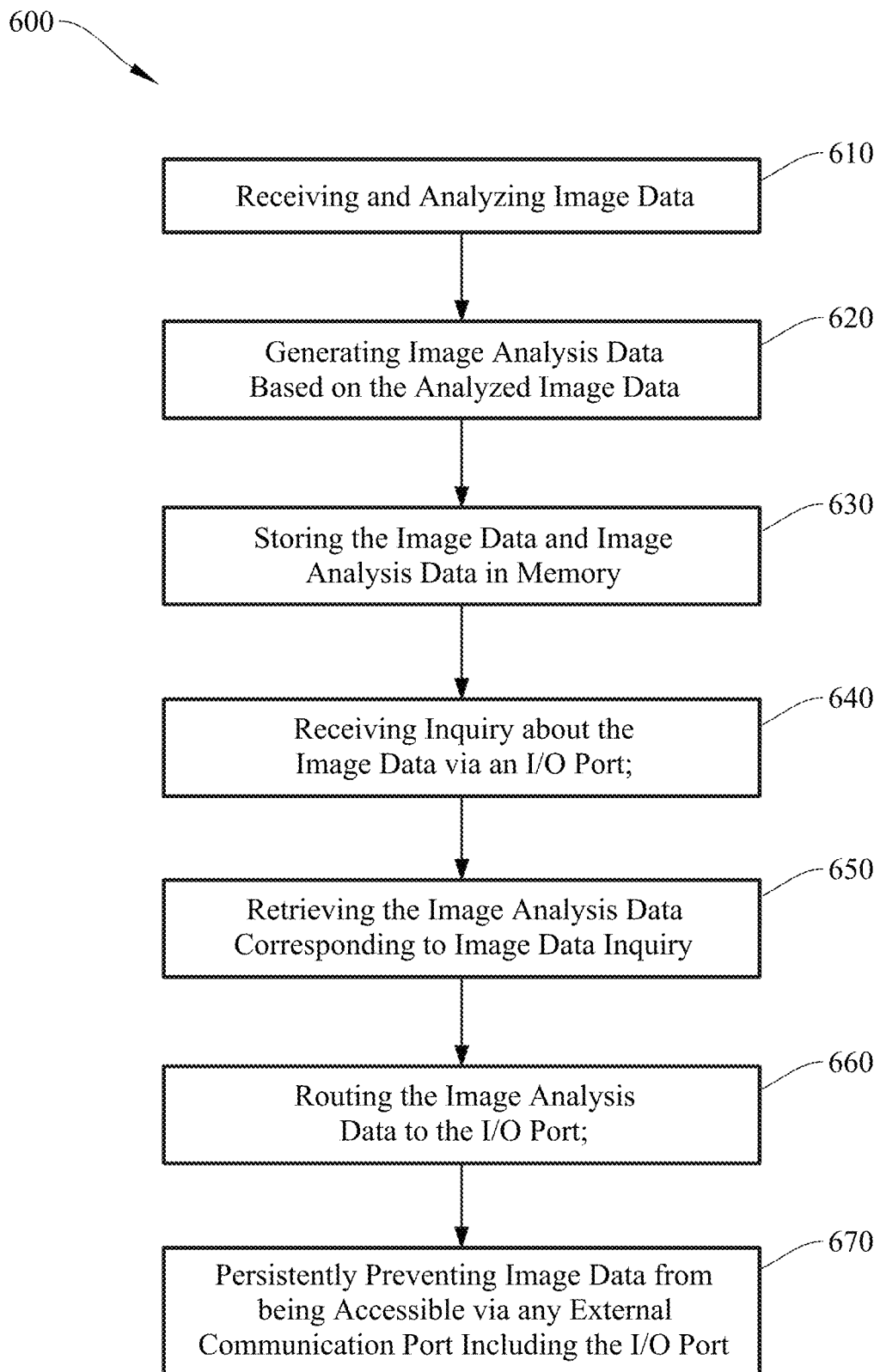
FIG. 6 shows a simplified flow chart for transferring data to and from a data-secure sensor system in a trusted environment, according to certain embodiments.

FIG. 6 shows a simplified flow chart for transferring data to and from a data-secure camera system in a trusted environment 300, according to certain embodiments. Method 600 can be performed by processing logic that may comprise hardware (circuitry, dedicated logic, etc.), software operating on appropriate hardware (such as a general purpose computing system or a dedicated machine), firmware (embedded software), or any combination thereof. In certain embodiments, method 600 can be performed by processor 310, AI processor 330, or any combination thereof, as shown in FIGS. 3-5.

At block 610, method 600 can include receiving and analyzing image data by one or more processors (e.g., processor 310, AI processor 330), according to certain embodiments. For example, image data can be pixel information (e.g., red, green, and blue values for one or more pixels, intensity data, pixel array data, etc.) generated (or captured) by sensor 305. The image data can be raw image data or processed image data (via sensor processor 360). Alternatively or additionally, additional data may be received and analyzed including audio data from microphone(s) 305(2) and other additional sensors 305(3), which may or may not be further processed by sensor processor 360. Some examples of other sensor data may include radar image data, sonar image data, ultrasound data, or other data that can, for example, be used to recognize patterns and/or may have security concerns.

At block 620, method 600 can include generating image analysis data based on the analyzed image data, according to certain embodiments. In some cases, the image analysis data can include information about identified objects or activity in an area. For example, the image analysis data may include information about an identified person, such as who the person is, how long they have been in the area being surveilled (e.g., via sensor 305), what activities are being performed (e.g., the user is standing in front of a sink), whether the identified person has access privileges to the area), whether unauthorized activity (e.g., tampering with a safe) is occurring (e.g., based on a privilege hierarchy), and the like. Typically, the image analysis data only includes information (typically, textually-based information) about the image data, but does not include the image data itself, which is typically secured within a trusted environment (e.g., in memory 340), as shown and described above with respect to FIGS. 3-5. In some embodiments, image/video data and image/video analysis data may be stored in separate memories (whether on physically separate integrated circuits (ICs) or on a single IC, but isolated from each other. Referring to these examples, processor 310, AI processor 330, or other processors taken separately or in any suitable combination may generate some or all of the image analysis data for the received image data. In certain embodiments, the data-secure camera system in the trusted environment can be integrated on a single integrated circuit and the memory block can be inaccessible via any externally accessible electrical contact on the integrated circuit including the I/O port. In some cases, only the one or more processors may have read and write access to the memory block.

At block 630, method 600 may include storing the image data and image analysis data in a non-transitory memory block, according to certain embodiments. In the embodiments of FIGS. 3-5, the image data and image analysis data can be stored in memory 340. In alternative embodiments, image/video data may be stored in a memory block only accessible from AI processor 330. It should be understood that memory 340 may include a memory array, multiple memory arrays, different types of memories (e.g., DRAM, PCM, SRAM, etc.), different circuit topologies, memories on different silicon substrates (but in a same package), etc., as would be appreciated by one of ordinary skill in the art with the benefit of this disclosure.

At block 640, method 600 can include receiving an inquiry about the image data via an external source, according to certain embodiments. In some cases, inquiries may be received by a communications I/O port (e.g., I/O port 315). Inquiries are typically limited to text-based requests for information as the communication path may be limited to a low bandwidth (e.g., less than 15 kbps) due to an I/O choke placed in line with the communication data path. By way of example, and referring to FIG. 3, the inquiry may ask if anyone entered a safe room with a video sensor 305 within the last 24 hours, if someone is present in the safe room and what is their identity, etc., as further discussed above with respect to FIGS. 3-5. The inquiry can be a user-initiated inquiry about identified objects or activity in the area. In some aspects, the inquiry may be initiated by an automated process (e.g., automatic periodic checking on a secure location, such as a location of a safe), and the inquiry may originate locally or remotely.

At block 650, method 600 can include retrieving a portion of the image analysis data corresponding to the inquiry from the memory block, according to certain embodiments. For example, in response to the inquiry (e.g., did anyone enter the safe room in the last 24 hours?), processor 310 can access any corresponding image analysis data associated with image data for the last 24 hours to answer the question (e.g., yes or no).

At block 660, method 600 can include routing the retrieved portion of the image analysis data to an I/O port that includes an I/O choke configured to limit a communication bandwidth of the I/O port to a maximum data rate that is set between 5 kbps and 100 kbps, according to certain embodiments. In particular embodiments, the I/O choke may limit the data rate to 15 kbps. One example of an I/O choke is shown and described above with respect to FIG. 3 as I/O choke 370. In some cases, the routing includes sending the corresponding retrieved portion (e.g., affirming or denying that someone was present in the safe room in the last 24 hours) from the trusted environment 300 (e.g., from processor 310) to a destination external to the trusted environment 300 (e.g., the requesting processor 420), as described above with respect to FIGS. 3-5.

At block 670, method 600 can include persistently preventing the image data from being accessible via any external communication port of the data-secure camera system, including the I/O port. This can be achieved in a number of different ways. For example, one or more processors in the trusted environment may operate under a communication protocol that does not allow image data to be retrieved from stored memory for the purposes of communicating said image data to an outside entity. In some embodiments, a security processor (e.g., SEP 410, 510) may be configured to monitor data traffic to identify any image data passing through an I/O port (I/O port 315) and taking a corresponding action in the event that image data is detected, as further described above with respect to FIG. 4. In some cases, the data-secure camera system may integrated on a single integrated circuit, and the memory block may be inaccessible via any externally accessible electrical contact on the integrated circuit including the I/O port.

It should be appreciated that the specific steps illustrated in FIG. 6 provide a particular method 600 for transferring data to and from a trusted environment, according to certain embodiments. Other sequences of steps may also be performed according to alternative embodiments. Furthermore, additional steps may be added or removed depending on the particular applications. For example, method 600 can further include monitoring the I/O port for data traffic containing structured image data or video data and taking a remedial action upon detecting data traffic having structured image data or video data. Remedial actions can include, with limitation: initiating an alert; ceasing all data traffic into and out of the I/O port for a predetermined time; requesting secure authorization; restoring a preset firmware configuration to a trusted environment; and shutting down the data-secure camera system.

Alternatively or additionally, the one or more processors may include a machine learning (ML) processor configured to generate the image analysis data. In such cases, the data-secure camera system can further include an input port and a second memory block communicatively coupled between input port and the one or more processors, and the second memory block may be configured to store configuration data received via the input port, where the configuration data can operate to update the ML processor. In some aspects, the second memory block may only writeable via the input port and only readable via the one or more processors, as described above at least with respect to FIGS. 3-4.

In yet further embodiments, the one or more processors can include a processor configured external to the I/O port, the processor including machine learning capabilities and configured to: analyze data traffic passing through the I/O port; perform data-type classification of the data traffic; and take a remedial action upon detecting data traffic containing data corresponding to an unauthorized data-type classification. In some cases, the data-type classification may include an image data classification, video data classification, audio data classification, text-data classification, or the like. Any combination of changes to method 600 as described above can be used and one of ordinary skill in the art with the benefit of this disclosure would understand the many variations, modifications, and alternative embodiments thereof.

Alternative Embodiments for a Trusted Environment

Figure 7:
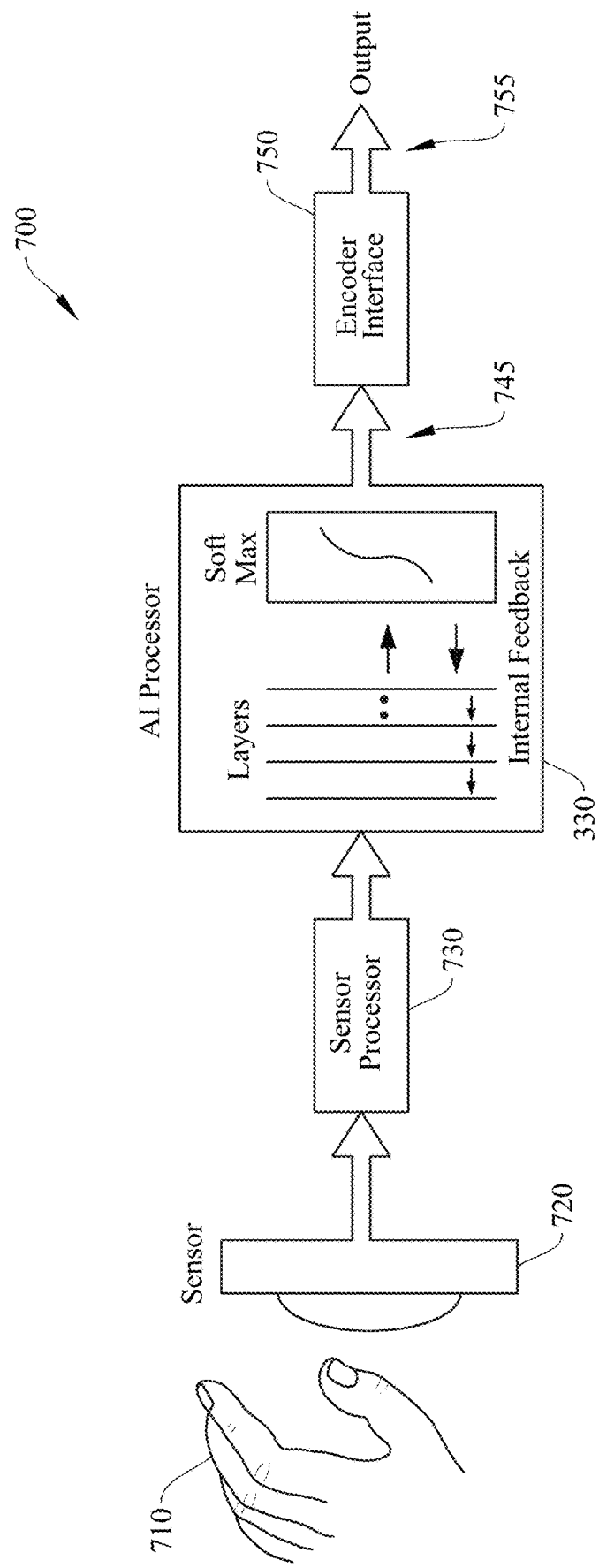
FIG. 7 shows an alternative embodiments of a simplified block diagram of a trusted environment in a data-secure sensor system, according to certain embodiments.

FIG. 7 shows an alternative embodiments of a simplified block diagram of a trusted environment in a data-secure camera system 700, according to certain embodiments. System 700 depicts a presence and/or a motion of a user 710 detected by an sensor 720. Sensor 720 may be any suitable type of sensor including one or more image sensors, audio sensors, vibration sensors, temperature sensors, etc., as would be appreciated by one of ordinary skill in the art with the benefit of this disclosure. For the purpose of explanation and not limitation, the embodiment described here utilizes an image sensor and is referred to as such. Sensor 720 feeds scene images to an Sensor Processor 730, which may apply pre-processing to render the images suitable for feeding to a (e.g., pre-trained) neural network operated by AI processor 330. The pre-processing can include, for example, level control, mean removal, contrast enhancement, or the like. AI processor 330 may be either a feed-forward type for simple image recognition, or may include internal feedback for sequence recognition, which may be used for identifying gestures, particular movements, etc. Feedback, if present, can be strictly internal to AI processor 330. The output 745 of AI processor 330 can be a set of image or pose probabilities which is fed, in a strictly forward direction, to Encoder Interface 750, which can, for example, provide high-level pose abstractions at output 755. For example, if a pre-programmed gesture is recognized by system 700 (e.g., right-to-left hand wave by a person), then an output (e.g., a brief binary code or other suitable output) may be issued that indicates that a gesture (or more specifically the type of gesture) was recognized, and in some cases a confidence level of the correctness of the recognition. The components of system 700 may be similar to aspects of system 300. For example, sensor processor 730 may perform functions similar to sensor processor 360 and/or sensor processor 360, AI processor 330 may perform functions similar to AI processor 330, and encoder interface 750 may perform functions similar to processor 310. In some embodiments, system 700 may not include a programmable interface (like external access memory 350) to ensure a one-way data path from sensor to encoder interface 750.

In certain embodiments, due to the architecture and construction of the hardware (e.g., the architecture of system 700) there are no image pixels available at the high-level pose abstractions level (output 755), and only the brief binary code (or other non-image based contextual output, as described above). Some implementations have no physical or software connections from the application software back to sensor 720. In such cases, there is no possibility of getting from the high-level post abstractions of output 755 and deriving the original images in any way, shape, or form.

In the event of a system compromise through a successful hack by bad actors, the most that could possibly be leaked is the contextual output of output 755 (e.g., binary code which identifies a gesture). For instance, a hacker could find out there was a gesture, but there is physically no way to get an image of the hand that made the gesture, the person, their dwelling, or any image data.

System 700 can be implemented in custom hardware (e.g., on a monolithic and/or common-substrate integrated circuit), which may not be field-programmable or altered. Thus, certain embodiments may be physically impossible to be attacked by any software vector (e.g., a virus) that could repurpose the functionality of system 700 to get access to the images. In some cases, system 700 may incorporate some or all aspects of the embodiments of FIGS. 2-6. Alternatively or additionally, the embodiments of FIGS. 2-6 may incorporate some or all aspects of system 700 of FIG. 7. One of ordinary skill in the art with the benefit of this disclosure would appreciate the many modifications, variations, and alternative embodiments thereof.

Any suitable type of neural network can be used, such as a deep convolutional network. Multiple layers and multiple levels of abstraction may be used to analyze the sensor data. For example, a first layer may analyze image data for edge detection, and subsequent layers may analyze for shape detection, object/human/gesture/movement detection, human/object feature detection, distinct object/human detection, etc., followed by a process to encode the detected and identified object, person, activity, etc. For the purposes of explanation, the detected object/gesture/movement/human, etc., will be referred to here as an "image," with the understanding that any suitable sensor input data can be processed in a similar manner, as described above.

Once the neutral network identifies and encodes the image (e.g., describes via natural language, outputs a binary code, etc.), the image information may be removed, erased, or otherwise discarded. Thus, only certain characteristics of the image data are preserved (e.g., contextual information—not image data itself). In some embodiments, the image data may be written over with new incoming image data as soon as the neural network analyzes it. In some cases, the buffer may be cleared at particular intervals (e.g., every second), which may be an interval that is long enough for an image to be processed, but little to no additional time to prevent bad actors from accessing the image data. In some cases, an image buffer can be locked until analysis progresses through the neural network, and then it may be cleared or written over with new image data. Further embodiments may employ a first-in-first-out (FIFO) type data stack where you move image data from the stack to process in AI processor 330 and subsequently (immediately) delete the image data from the buffer. Some embodiments may use multiple methods to secure image data. For instance, some embodiments may employ a FIFO stack with a time-based data wipe that occurs at a time frame larger than the time to feed the image data through AI processor 330. Thus, data is removed from the buffer as it is processed and a second deletion failsafe (erasure) occurs at a time when the image data analysis should be completed. Alternatively or additionally, other aspects of image protection may be employed, such as hardware chokes, security processors, system and/or sensor shutdown, or the like, as further described above with respect to FIGS. 3-6. One of ordinary skill in the art with the benefit of this disclosure would appreciate the many modifications, variations, and alternative embodiments thereof.

Figure 8:
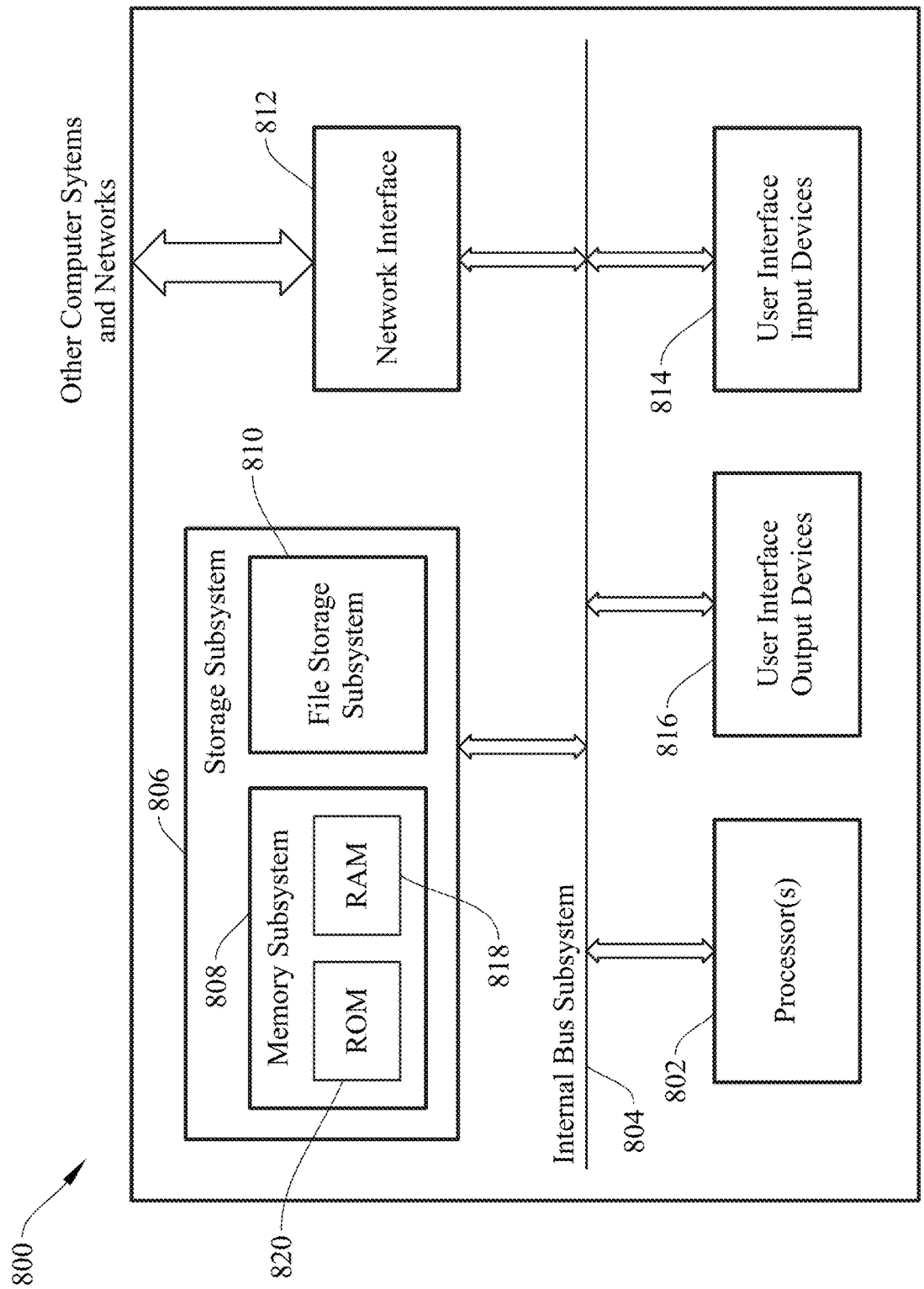
FIG. 8 shows a system for operating aspects of the "normal environments" described herein, according to certain embodiments.

FIG. 8 shows a system 800 for operating aspects of the "normal environments" described herein, according to certain embodiments. System 800 can include one or more processors 802 that can communicate with a number of peripheral devices (e.g., input devices) via a bus subsystem 804. These peripheral devices can include storage subsystem 806 (comprising memory subsystem 808 and file storage subsystem 810), user interface input devices 814, user interface output devices 816, and network interface subsystem 812. User input devices 814 can be any of the input device types described herein (e.g., keyboard, computer mouse, remote control, etc.). User output devices 816 can be a display of any type, including computer monitors, displays on handheld devices (e.g., smart phones, gaming systems), or the like, as would be understood by one of ordinary skill in the art. Alternatively or additionally, a display may include virtual reality (VR) displays, augmented reality displays, holographic displays, and the like, as would be understood by one of ordinary skill in the art.

In some examples, internal bus subsystem 804 can provide a mechanism for letting the various components and subsystems of computer system 800 communicate with each other as intended. Although internal bus subsystem 804 is shown schematically as a single bus, alternative embodiments of the bus subsystem can utilize multiple buses. Additionally, network interface subsystem 812 can serve as an interface for communicating data between computer system 800 and other computer systems or networks. Embodiments of network interface subsystem 812 can include wired interfaces (e.g., Ethernet, CAN, RS232, RS485, etc.) or wireless interfaces (e.g., Bluetooth®, BLE, ZigBee®, Z-Wire®, Wi-Fi, cellular protocols, etc.).

In some cases, user interface input devices 814 can include a keyboard, a presenter, a pointing device (e.g., mouse, trackball, touchpad, etc.), a touch-screen incorporated into a display, audio input devices (e.g., voice recognition systems, microphones, etc.), Human Machine Interfaces (HMI) and other types of input devices. In general, use of the term "input device" is intended to include all possible types of devices and mechanisms for inputting information into computer system 800. Additionally, user interface output devices 816 can include a display subsystem, a printer, or non-visual displays such as audio output devices, etc. The display subsystem can be any known type of display device. In general, use of the term "output device" is intended to include all possible types of devices and mechanisms for outputting information from computer system 800.

Storage subsystem 806 can include memory subsystem 808 and file storage subsystem 810. Memory subsystems 808 and file storage subsystem 810 represent non-transitory computer-readable storage media that can store program code and/or data that provide the functionality of embodiments of the present disclosure. In some embodiments, memory subsystem 808 can include a number of memories including main random access memory (RAM) 818 for storage of instructions and data during program execution and read-only memory (ROM) 820 in which fixed instructions may be stored. File storage subsystem 810 can provide persistent (e.g., non-volatile) storage for program and data files, and can include a magnetic or solid-state hard disk drive, an optical drive along with associated removable media (e.g., CD-ROM, DVD, Blu-Ray, etc.), a removable flash memory-based drive or card, and/or other types of storage media known in the art.

It should be appreciated that computer system 800 is illustrative and not intended to limit embodiments of the present disclosure. Many other configurations having more or fewer components than system 800 are possible. The various embodiments further can be implemented in a wide variety of operating environments, which in some cases can include one or more user computers, computing devices or processing devices, which can be used to operate any of a number of applications. User or client devices can include any of a number of general purpose personal computers, such as desktop or laptop computers running a standard or non-standard operating system, as well as cellular, wireless and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially available protocols, such as TCP/IP, UDP, OSI, FTP, UPnP, NFS, CIFS, and the like. The network can be, for example, a local area network, a wide-area network, a virtual private network, the Internet, an intranet, an extranet, a public switched telephone network, an infrared network, a wireless network, and any combination thereof.

In embodiments utilizing a network server, the network server can run any of a variety of server or mid-tier applications, including HTTP servers, FTP servers, CGI servers, data servers, Java servers, and business application servers. The server(s) also may be capable of executing programs or scripts in response to requests from user devices, such as by executing one or more applications that may be implemented as one or more scripts or programs written in any programming language, including but not limited to Java®, C, C# or C++, or any scripting language, such as Perl, Python or TCL, as well as combinations thereof. The server(s) may also include database servers, including without limitation those commercially available from Oracle®, Microsoft®, Sybase® and IBM®.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a non-transitory computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or browser. It should be appreciated that alternate embodiments may have numerous variations from that described above. For example, customized hardware might also be used and/or particular elements might be implemented in hardware, software (including portable software, such as applets) or both. Further, connections to other computing devices such as network input/output devices may be employed.

As described above, one aspect of the present technology is the gathering and use of data available from various sources and controlling the safe and secure transfer and/or storage of said data in a trusted environment. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to deliver targeted content that is of greater interest to the user. Accordingly, use of such personal information data enables users to calculated control of the delivered content. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services on user interface platforms for the trusted environment, the present technology can be configured to allow users to select to "opt in" or "opt out" of participation in the collection of personal information data during registration for services or anytime thereafter. In another example, users can select not to provide mood-associated data for targeted content delivery services. In yet another example, users can select to limit the length of time mood-associated data is maintained or entirely prohibit the development of a baseline mood profile. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publicly available information.

The present document provides illustrations and descriptions, but is not intended to be exhaustive or to limit the scope of the invention to the precise form disclosed. Modifications and variations are possible in light of the above teachings or may be acquired from practice of various implementations of the present disclosure.

What is claimed is:

1. A data-secure system comprising:
   one or more processors embodied within a physically closed environment, the one or more processors configured to:
   receive sensor data corresponding to a physical area; and
   generate descriptive data based on the received sensor data, the descriptive data being different than the sensor data, and the descriptive data corresponding to information that describes content captured by the sensor data specifically about identified objects or activity in the physical area, wherein the descriptive data is generated within the closed environment;
   wherein the one or more processors are further configured to:
   prevent the received sensor data from ever being accessible outside of the closed environment via all external ports of the data-secure system including an input/output (I/O) port; and
   allow the descriptive data to be accessible via the (I/O) port.

2. The data-secure system of claim 1 wherein the sensor data is image data, wherein the descriptive data does not include the image data.

3. The data-secure system of claim 1 further comprising:
   a memory block, controlled by and only accessible by the one or more processors, the memory block configured to store the sensor data and corresponding descriptive data,
   wherein the memory block is inaccessible via any external port of the data-secure system including the I/O port, and wherein only the one or more processors have read and write access to the memory block.

4. The data-secure system of claim 1 wherein the one or more processors includes a machine learning (ML) processor configured to generate the descriptive data, wherein the data-secure system further includes:
   an input port; and
   a second memory block communicatively coupled between input port and the one or more processors, wherein the second memory block is configured to store configuration data received via the input port, the configuration data configured to update the ML processor, and
   wherein the second memory block is only writeable via the input port and only readable via the one or more processors.

5. The data-secure system of claim 1 further comprising:
   a data monitoring processor coupled to the I/O port and configured to:
   detect sensor data passing through the I/O port; and
   take remedial action in response to detecting the sensor data passing through the I/O port.

6. The data-secure system of claim 5 wherein the remedial action includes at least one of:
   initiating an alert;
   ceasing all data traffic into and out of the I/O port for a predetermined time;
   requesting secure authorization;
   restoring a preset firmware configuration to a trusted environment; or
   shutting down the data-secure system.

7. The data-secure system of claim 1 wherein the one or more processors, the I/O port, and the I/O choke are contained on a single integrated circuit.

8. A non-transitory computer-program product tangibly embodied in a machine-readable non-transitory storage medium that includes instructions configured to cause one or more processors of a data-secure system configured within a physically closed environment to:
- receive and analyze sensor data corresponding to a physical area, the sensor data received from one or more sensors configured within the closed environment;
- generate descriptive data based on the sensor data that includes information that describes content captured by the sensor data specifically about identified objects or activity in the physical area, wherein the descriptive data is different than the sensor data, and wherein the descriptive data is generated from within the closed environment;
- receive a request for information corresponding to the physical area;
- send the descriptive data to an input/output (I/O) port in response to receiving the request; and
- prevent the sensor data from ever being accessible via all external communication ports of the data-secure system, including the I/O port.

9. The computer-program product of claim 8 wherein the instructions are further configured to cause the one or more processors of the data-secure system to:
- monitor the I/O port for data traffic containing structured image data or video data; and
- take a remedial action upon detecting data traffic having structured image data or video data.

10. The computer-program product of claim 8 wherein the request is a user-initiated inquiry about the identified objects or activity in the physical area.

11. The computer-program product of claim 8 wherein the data-secure system is integrated on a single integrated circuit.

12. The computer-program product of claim 11 wherein the data-secure system includes a memory block configured to store the sensor data and descriptive data, wherein the memory block is inaccessible via any externally accessible electrical contact on the integrated circuit including the I/O port.

13. The computer-program product of claim 12 wherein only the one or more processors have read and write access to the memory block.

14. The computer-program product of claim 12 wherein the one or more processors includes a machine learning (ML) processor configured to generate the descriptive data, wherein the data-secure system further includes:
- an input port; and
- a second memory block communicatively coupled between input port and the one or more processors, wherein the second memory block is configured to store configuration data received via the input port, the configuration data configured to update the ML processor,
- wherein the second memory block is only writeable via the input port and only readable via the one or more processors.

15. The computer-program product of claim 8 wherein the one or more processors includes a processor configured external to the I/O port, the processor including machine learning capabilities and configured to:
- analyze data traffic passing through the I/O port;
- perform data-type classification of the data traffic; and
- take a remedial action upon detecting data traffic containing data corresponding to an unauthorized data-type classification.

16. The computer-program product of claim 15 wherein the data-type classification includes an image data classification, video data classification, audio data classification, or text-data classification.

* * * * *